(12) United States Patent
Pedersen et al.

(10) Patent No.: US 11,996,694 B2
(45) Date of Patent: May 28, 2024

(54) CONTROL SYSTEM FOR A POWER PLANT

(71) Applicant: VESTAS WIND SYSTEMS A/S, Aarhus N (DK)

(72) Inventors: Claus Thyge Pedersen, Lystrup (DK); Tobias Gybel Hovgaard, Ry (DK)

(73) Assignee: Vestas Wind Systems A/S, Aarhus N (DK)

( * ) Notice: Subject to any disclaimer, the term of this patent is extended or adjusted under 35 U.S.C. 154(b) by 483 days.

(21) Appl. No.: 17/288,852

(22) PCT Filed: Sep. 25, 2019

(86) PCT No.: PCT/DK2019/050286
§ 371 (c)(1),
(2) Date: Apr. 26, 2021

(87) PCT Pub. No.: WO2020/083450
PCT Pub. Date: Apr. 30, 2020

(65) Prior Publication Data
US 2022/0006297 A1    Jan. 6, 2022

(30) Foreign Application Priority Data
Oct. 24, 2018   (DK) ........................... PA 2018 70693

(51) Int. Cl.
*H02J 3/38*        (2006.01)
*F03D 9/00*        (2016.01)
(Continued)

(52) U.S. Cl.
CPC .............. *H02J 3/381* (2013.01); *F03D 9/007* (2013.01); *F03D 80/20* (2016.05); *G05B 13/024* (2013.01);
(Continued)

(58) Field of Classification Search
CPC .... F03D 80/20; F03D 9/007; F05B 2220/708; G05B 13/024; G05B 13/026;
(Continued)

(56) References Cited

U.S. PATENT DOCUMENTS

| | | | |
|---|---|---|---|
| 2007/0041837 A1* | 2/2007 | Ide | ........................ F03D 7/024 |
| | | | 416/147 |
| 2009/0178668 A1 | 7/2009 | Boggavarapu | |

(Continued)

FOREIGN PATENT DOCUMENTS

| | | |
|---|---|---|
| EP | 3841299 A1 | 6/2021 |
| IN | 201641011197 A * | 11/2017 |

(Continued)

OTHER PUBLICATIONS

Danish Patent and Trademark Office 1st Technical Examination for Application No. PA 2018 70693 dated Apr. 5, 2019.
(Continued)

*Primary Examiner* — Kidest Bahta
(74) *Attorney, Agent, or Firm* — Patterson + Sheridan, LLP

(57) ABSTRACT

A controller for controlling the operation of a power plant, the power plant comprising a wind turbine and a solar power generator, the controller comprising: an input arranged to receive an input signal indicative of an operating parameter of the solar power generator; a shadow detection module arranged to monitor the operating parameter and to detect a shadow at least partially shading the solar power generator, the detected shadow being caused by a blade of the wind turbine; a shadow prediction module arranged to predict at least one subsequent blade shadow in dependence on the detected blade shadow; a command module arranged to determine a command signal for controlling the solar power generator based on the blade shadow prediction; and an
(Continued)

output arranged to output the command signal to the solar power generator.

17 Claims, 4 Drawing Sheets

(51) Int. Cl.
  *F03D 80/20* (2016.01)
  *G05B 13/02* (2006.01)
  *H02J 3/46* (2006.01)
  *H02J 13/00* (2006.01)
  *H02S 50/00* (2014.01)

(52) U.S. Cl.
  CPC ............. *G05B 13/026* (2013.01); *H02J 3/46* (2013.01); *H02J 13/00002* (2020.01); *H02S 50/00* (2013.01); *F05B 2220/708* (2013.01); *H02J 2300/26* (2020.01); *H02J 2300/28* (2020.01)

(58) Field of Classification Search
  CPC ............. H02J 13/00002; H02J 2300/26; H02J 2300/28; H02J 3/381; H02J 3/46; H02S 50/00; Y02E 10/56; Y02E 10/72; Y02E 10/76
  See application file for complete search history.

(56) References Cited

U.S. PATENT DOCUMENTS

| | | | |
|---|---|---|---|
| 2011/0220091 A1 | 9/2011 | Kroyzer | |
| 2012/0267901 A1 | 10/2012 | Shufflebotham | |
| 2013/0106107 A1* | 5/2013 | Spruce | F03D 7/0224 290/44 |
| 2013/0184884 A1 | 7/2013 | More et al. | |
| 2013/0229731 A1* | 9/2013 | Shaver, II | H01L 31/02021 361/18 |
| 2014/0166076 A1* | 6/2014 | Kiani | F24S 90/00 136/246 |
| 2017/0102675 A1* | 4/2017 | Drees | H02S 40/30 |

FOREIGN PATENT DOCUMENTS

| | | |
|---|---|---|
| WO | 2013066801 A1 | 5/2013 |
| WO | 2017193153 A1 | 11/2017 |
| WO | 2020038537 A1 | 2/2020 |
| WO | 2020083450 A1 | 4/2020 |

OTHER PUBLICATIONS

PCT Notification of Transmittal of the International Search Report and the Written Opinion of the International Searching Authority, or the Declaration for Application No. PCT/DK2019/050286 dated Jan. 15, 2020.

European Patent Office, Communication under Rule 71(3) EPC for Application 19 780 144.2-1211 dated Feb. 2, 2023.

* cited by examiner

CONTROL SYSTEM FOR A POWER PLANT

TECHNICAL FIELD

The present invention relates to a controller for a power plant (power plant), the power plant comprising a wind turbine generator and a solar power generator. The invention also relates to a method of controlling a power plant and to a power plant comprising a wind turbine generator and a solar power generator.

BACKGROUND

It is known to construct power plants that include both wind and solar power generation systems. Such 'hybrid' power plants typically include multiple power generation sites and the electrical power generated at the multiple power generation sites is typically transmitted to a desired location or to a power grid at one or more locations. A typical power plant layout includes a wind turbine generator arranged together with a plurality of solar power generators.

The solar power generators may be photovoltaic (PV) modules, or panels, which are arranged together to form an array. The PV modules are connected to a converter (or inverter), which converts the direct current (DC) power supply from the PV modules into an alternating current (AC) power supply, or to a DC current supply with a different voltage, which can be transmitted to the power grid. The converter is arranged to apply load characteristics to the PV modules that give the highest power transfer efficiency between the solar array and the utility grid. The load characteristics change to suit the prevailing operating conditions of the PV array using a technique known as Maximum Power Point Tracking (MPPT). In particular, MPPT is used to maximize power extraction from each of the PV modules under varying operating conditions.

Shadowing of the PV modules due to clouds causes the shaded PV modules to experience a drop in their electrical power generation. The shadowing also causes PV modules to undergo accelerated degradation due to the uneven loading under uneven irradiance conditions. The converter's MPPT reacts to the shadowing by detecting a shadow as it passes over the PV modules, and adjusting the load characteristics of the affected PV modules accordingly. Therefore, the MPPT is arranged to combat the effects of the cloud shadowing in order to optimise the power output from the PV array.

The co-location of the wind turbine with the PV modules increases the likelihood of the wind turbine casting a shadow over the PV modules. The wind turbine typically includes a plurality of rotor blades mounted to a nacelle which is arranged on top of a large upstanding tower. The speed at which the rotor blades rotate about the nacelle causes the shadow from the rotor blades to move quickly across the PV modules such that the MPPT does not have time to react. Consequently, the shaded PV modules cause disruption to the MPPT algorithm which thereby reduces the output from the PV array and from the power plant, overall. It is an aim of the present invention to address disadvantages associated with the prior art.

SUMMARY OF INVENTION

According to an embodiment of the invention there is provided a controller for controlling the operation of a power plant (power plant), the power plant comprising a wind turbine generator and a solar power generator, the controller comprising: an input arranged to receive an input signal indicative of an operating parameter of the solar power generator; a shadow detection module arranged to monitor the operating parameter and to detect a shadow at least partially shading the solar power generator, the detected shadow being caused by a blade of the wind turbine; a shadow prediction module arranged to predict at least one subsequent blade shadow in dependence on the detected blade shadow; a command module arranged to determine a command signal for controlling the solar power generator based on the blade shadow prediction; and an output arranged to output the command signal to the solar power generator.

The controller is advantageously arranged to accommodate for the dynamic shadowing caused by the rotation of the turbine blades by predicting the incoming blade shadows. In particular, the controller is configured to control the operation of the solar power generator during subsequent shadow affected periods without having to constantly monitor and react to each periodic shadow that may be caused by the wind turbine blades. Thus, the controller advantageously improves the shadow affected operation of the solar power generator, which thereby increases the overall power output from the power plant.

The blade shadow prediction may comprise a timing between two subsequent predicted shadows. The blade shadow prediction may comprise a duration of the at least one subsequent blade shadow. The shadow prediction module is conveniently arranged to determine either a timing or a frequency of the detected blade shadow, which are used to accurately determine when the solar power generator is controlled in dependence on the subsequent shadow.

The blade shadow prediction may comprise two or more blade shadows which together define a repetitive shadow pattern. The shadow prediction module is able to conveniently analyse the timing and/or frequency of the detected blade shadow, or shadows, in order to determine the timing of one or more subsequent blade shadow(s) according to the teaching of the determined shadow pattern. The shadow pattern comprises information from a plurality of detected blade shadow, which provides a convenient and accurate means of determining when subsequent blade shadows will pass over the solar power generator.

The shadow prediction may comprise an initial timing of the subsequent blade shadow based on a first detected blade shadow, the shadow prediction module being configured to update the initial timing in dependence on a second detected shadow. The shadow prediction module may continuously update and/or overwrite the shadow prediction as the frequency and/or timing of the blade shadows changes over time. The controller is thereby able to adapt to changes in the turbine speed caused by corresponding changes to the wind speed, which would otherwise affect the operation of the solar power generator.

The command module may be configured to output a command signal to adjust a load characteristic of the solar power generator. The command signal may comprise a power point tracking value of the solar power generator. The command signal may be used by a power point tracking algorithm of the solar power generator. The controller conveniently co-operates with a power point tracking algorithm of the solar power generator such that the controller can be integrated into the existing control system for a hybrid power plant. The command signal may be arranged to continuously determine the optimum load characteristic, or maximum power point tracking value, for each solar power generator so that the power point tracking algorithm does not have to react to the fast moving blade shadows. Rather, the controller is arranged to proactively control the solar power generators in dependence on the fast moving blade shadows, which the power point tracking algorithm may be unable to accommodate.

The controller may be configured to control the solar power generator as the at least one subsequent blade shadow starts to at least partially shade the solar power generator. In this way, the solar power generator is proactively configured to optimise its power output whilst being shaded by the predicted blade shadow. This approach is particularly advantageous where the periodic blade shadowing is especially consistent such that the accuracy of the shadow prediction is reliable, which means that there is only a relatively small chance that the solar power generator will be configured when the shadow is not actually incident upon it.

The controller may be configured to control the solar power generator in advance of the at least one subsequent blade shadow at least partially shading the solar power generator. In so doing, the controller may control the solar power generator to adopt an optimal configuration before the predicted blade shadow is directly incident on the solar power generator. This approach conveniently accommodates for any delays in configuring the solar power generator and/or any inaccuracies in the blade prediction.

The controller according to any one of the preceding paragraphs may be combined with a light sensing means for providing the input signal to the controller, wherein the input signal indicative of an operating parameter of the solar power generator may comprise light sensor information associated with the solar power generator. The light sensor information provides an alternative means of determining when the solar power generator is being shadowed by the blades of the wind turbine.

The input signal may comprise a first and a second component, the first component being indicative of an operating parameter of the wind turbine and the second component being indicative of the sun's position relative to the wind turbine and the solar power generator; the shadow detection module may be configured to detect the blade shadow in dependence on the first and second components.

The operating parameter of the wind turbine may correspond to at least one of a rotation speed, a yaw position, an azimuth angle and a pitch of a blade of the wind turbine. The shadow prediction module may be configured to predict the at least one subsequent shadow in dependence on at least one of a) a time of day and b) a time of year.

The controller may be configured to activate the shadow detection module in dependence on receiving a further input signal, the further input signal being indicative of a set of predetermined meteorological conditions occurring in the vicinity of the solar power generator and/or wind turbine.

According to a further aspect of the present invention, there is provided a power plant (power plant) comprising a wind turbine generator, at least one solar power generator and a controller according to any one the preceding paragraphs.

According to a yet further aspect of the present invention, there is provided a method of controlling a power plant which comprises a wind turbine generator and at least one solar power generator, the method comprising: receiving an input signal indicative of an operating parameter of the at least one solar power generator; monitoring the operating parameter to detect a shadow at least partially shading the solar power generator, the detected shadow being caused by a blade of the wind turbine; predicting at least one subsequent blade shadow in dependence on the detected blade shadow, determining a command signal for controlling the at least one solar power generator in dependence on the blade shadow prediction; and outputting the command signal to the solar power generator.

It will be appreciated, however, that other arrangements are also useful, and therefore, the present invention is not intended to be limited to any particular arrangement. In any event, the set of instructions (or method steps) described above may be embedded in a computer-readable storage medium (e.g. a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

It will be appreciated that the foregoing represents only some of the possibilities with respect to the particular subsystems of a power plant which may be included, as well as the arrangement of those subsystems with the control unit. Accordingly, it will be further appreciated that embodiments of a power plant which include other or additional subsystems and subsystem arrangements remain within the spirit and scope of the present invention. Additional sub-systems may include, for example, systems relating to any wind turbine control function.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

In the following detailed description, reference is made to the accompanying drawings which form a part hereof, and which illustrate specific embodiments of the invention.

These embodiments are described in sufficient detail to enable those of ordinary skill in the art to make and use them.

Figure 1:
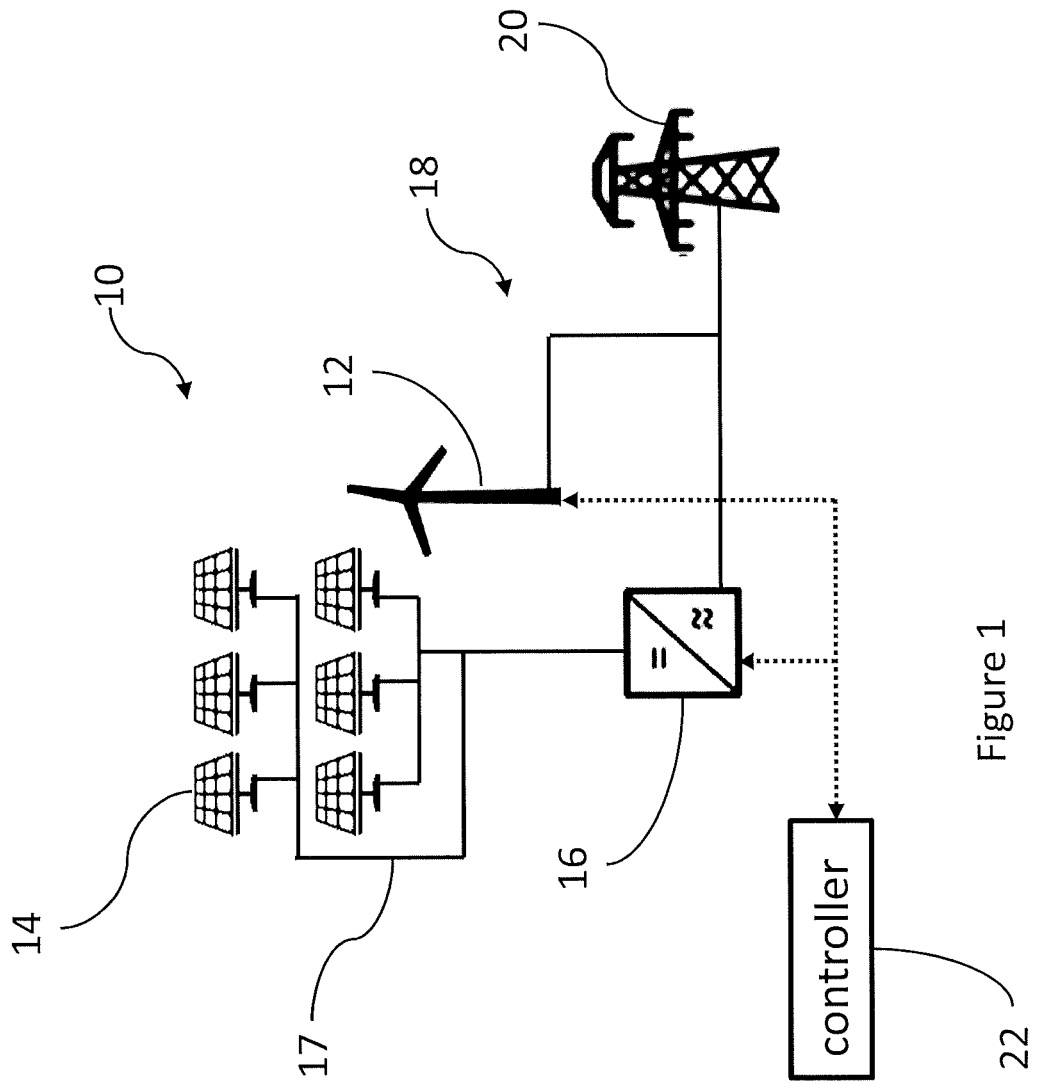
FIG. 1 illustrates a power plant and its connection to a main transmission grid.

FIG. 1 illustrates the basic architecture of a power plant 10 in which a wind turbine generator, often more commonly referred to as a wind turbine 12, and a plurality of solar power generators 14, in the form of photovoltaic (PV) modules, are electrically connected via a converter 16 to a local power network 18 of the power plant 10. A number of the solar power generators 14 are arranged in a shadow affected region of the power plant 10, which means that at least one of the solar power generators 14 can be overshadowed by a blade of the wind turbine 12 during the operation of the power plant 10. In an embodiment of the present invention predicts the timing of a shadow caused by a blade of the wind turbine 12 passing over a solar power generator 14, and controls the solar power generator 14 in dependence on the blade shadow prediction.

Figure 2:
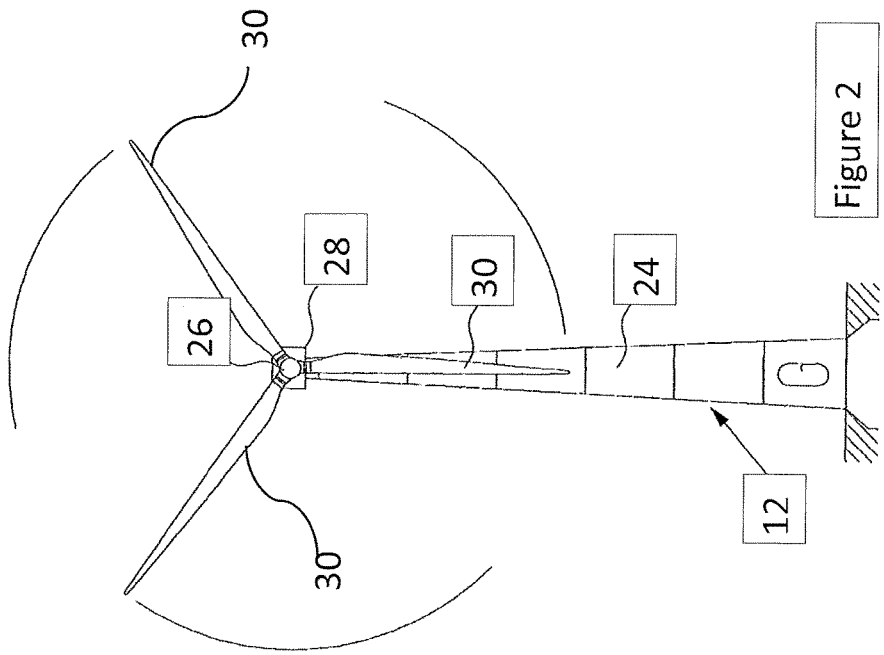
FIG. 2 illustrates a wind turbine used in the power plant of FIG. 1.

The wind turbine 12 converts wind energy into electrical energy, which is transferred from the wind turbine 12 to the main transmission grid 20 as active and/or reactive power, for distribution. With reference to FIG. 2, the wind turbine 12 comprises a conventional arrangement of a tower 24, a nacelle 26, a rotor 28 with three blades 30. The tower 24 stands on the ground, and the nacelle 26 which rests on the top of the tower 24, carries a turbine shaft, a gearbox, a brake and a generator (not shown). The turbine blades 30 are attached to the central rotor 28, or hub, which is mounted to the turbine shaft externally of the nacelle 26.

During operation of the wind turbine 12, the turbine blades 30 rotate (in a clockwise direction when viewed face-on) causing the shaft to rotate under the influence of wind, which in turn drives a generator to generate electrical power as alternating current (AC) electricity. The AC power is then transmitted to the power grid 20 via the local network 18. The wind turbine 12 may include its own converter which is configured to convert the AC electricity from the generator into higher voltage AC electricity which is more suitable for transmission to the power grid 20.

Figure 5:
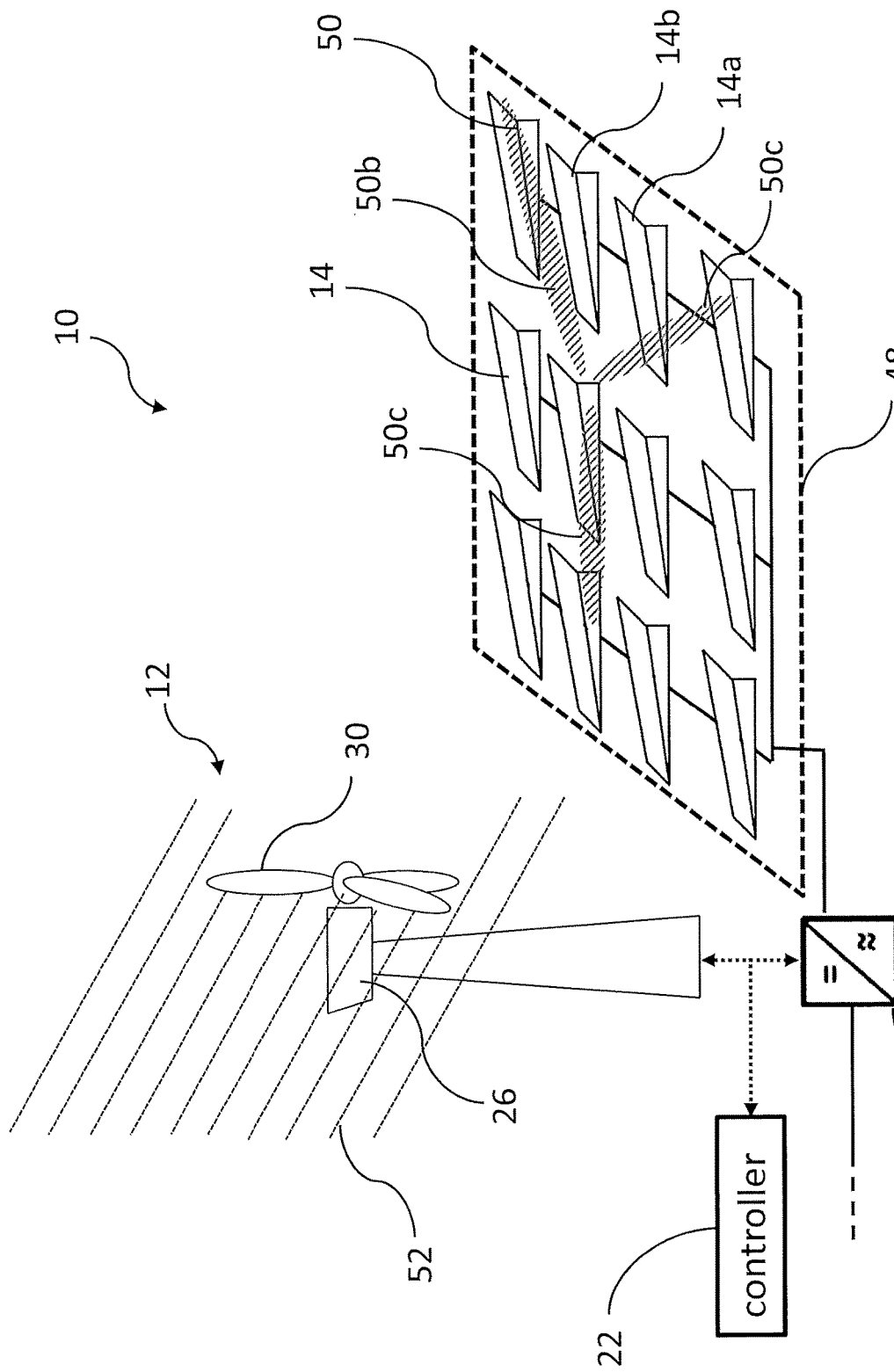
FIG. 5 illustrates a wind turbine and a plurality of photovoltaic modules used in the power plant of FIG. 1.

The rotation of the turbine blades 30 causes a moving blade shadow to be cast upon the ground below, as illustrated in FIG. 5. The power plants 10 in FIG. 1 and FIG. 2 are shown with only one wind turbine 12 however, it will be appreciated that a power plant 10 may comprise a plurality of wind turbines 12 arranged with a plurality of solar power generators 14 arranged around each of the wind turbines 12.

The solar power generators 14 convert solar radiation energy into electrical energy, which is sent to the converter 16 via the local power network 18. The plurality of solar power generators 14 are typically grouped together so as to maximise the absorption of the sun's radiation which is cast over the power plant 10. It will be appreciated that each of the components of the power plant 10 are generally arranged for optimal yearly power generation depending on the geographical location of the power plant 10. Accordingly, for a power plant 10 located in the northern hemisphere, the solar power generators 14 are arranged to face towards a generally southerly direction.

Each solar power generator 14 comprises a panel made up of a plurality of silicon solar cells connected together in series. In embodiments, the solar power generator 14 comprises a plurality of PV modules 32, or panels, which are arranged together in the same general location and which are controlled by a single converter 16 (or inverter). In this way, each solar power generator 14 may be considered to comprise its own converter 16. Alternatively, each PV module 32 may be provided with its own converter (commonly referred to as a micro-converter).

Figure 3:
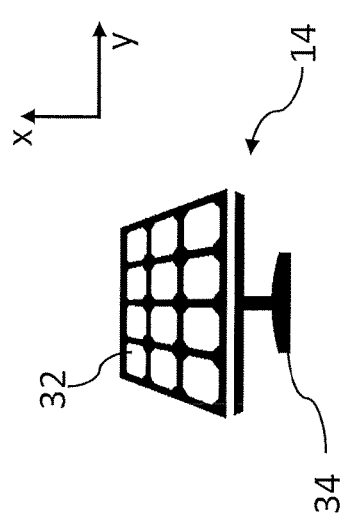
FIG. 3 illustrates a photovoltaic module used in the power plant of FIG. 1.

The solar power generator 14 in FIG. 3 is shown comprising twelve PV modules 32 which are arranged in three rows of four PV modules 32. It will be appreciated that these PV modules 32 may be arranged in any number of suitable configurations without departing from the scope of the present invention. Each solar power generator 14 comprises a series of wires (not shown) which form electrical connections between the plurality of PV modules 32 that make up each solar power generator 14. Each of the solar power generators 14 are interconnected by a further set of wires 17 that define at least part of the local power network 18, as shown in FIG. 1. The plurality of PV modules 32 are mounted on a support structure 34 which is configurable to allow rotation, and/or pivoting, of the PV modules 32 towards the sun.

The PV support structure 34 is arranged to enable pivoting of the PV modules 32 about a substantially horizontal axis of the solar power generator 14, thereby allowing the modules to track the sun as it rises and falls in the sky throughout the course of a day. The support structure 34 is arranged in a fixed orientation relative to a vertically aligned axis of the solar power generator 14. The vertical and horizontal axes of the solar power generator 14 are aligned, respectively, with the x and y directions as shown in FIG. 3.

The PV support structure 34 is configured to allow the PV modules 32 to be inclined towards the earth's equator, with an angle between 0 and 90 degrees. An inclination angle of 0 degrees corresponds to the PV modules 14 being substantially horizontal to the ground and an inclination angle of 90 degrees corresponds to the PV modules 32 being arranged in a substantially vertical orientation. In alternative embodiments, the support structure 34 is arranged to rotate the PV modules 32 relative to the vertical axis of the solar power generator 14 so that they may track the sun's lateral movement across the sky.

Each solar power generator 14 may further comprise a heliostatic control system that controls the movement of the PV modules 32 so that they may automatically track the sun's position in the sky. Controlling the movement of the PV modules 32 may also be controlled manually by an operator of the power plant 10 in order to orientate the PV modules 32 towards incident radiation from the sun. Automatic and/or manual orientation of the PV modules 32 is achieved through the operation of a motorised actuation means; the motorised actuation means being arranged to rotate the PV modules 32. Furthermore, it will be clear to the skilled person that the PV modules 32 may be orientated according to any other suitable orientation means without departing from the present invention.

The local power network 18 includes a number of connecting lines (shown as solid lines in FIG. 1) which electrically connect each of the power generating sites (i.e. each of the solar power generators 14 and/or wind turbines 12) together according to the requirements of the power plant 10. The main transmission grid 20 may be an international, national, or regional grid such as the National Grid of Great Britain, for example. The local power network 18 is arranged to deliver electrical power to a main transmission grid 20. The regulation and general operation of the power plant 10 is controlled by a power plant controller 22, or control system.

The converter 16 is configured to condition the electrical power that is generated by the solar power generators 14 so that it is more suited to being transmitted within the local power network 18. In particular, the converter 16 is arranged to convert DC electricity from the solar power generators 14 into higher voltage DC electricity. To achieve this, the converter 16 employs a power point tracker algorithm to control the DC output from the solar power generators 14. The power point tracker determines a characteristic load which is addressed to the PV modules 32. The power point tracker then monitors the DC input that it receives from the PV modules 32 and converts it to high frequency AC electricity supply within the converter 16. The high frequency AC supply is then converted back down to a DC supply that has a voltage and current which closely matches the requirements of the local power network 18.

The power point tracker determines the characteristic load (i.e. voltage) which, when applied to the PV modules 32, will produce the most usable power output. This optimum load characteristic is called the 'maximum power point' because it defines the load characteristic that gives the highest power transfer efficiency of the converter 16. The power point tracking algorithm is arranged to continuously adapt the power point in dependence on the real-time output from the solar power generator(s) 14. For example, as the amount of sunlight varies, so does the output from the PV modules 32. The power point tracking algorithm is configured to determine the load that, when applied to the PV modules 32, will give the highest power transfer efficiency. The optimum load characteristic is applied across the solar power generator(s) 14 and then the converter 16 is configured to obtain the maximum power transfer from the resulting output it receives from the solar power generator(s) 14.

The power point tracking algorithm enables the converter 16 to react to large (or slow) changes in the performance of the solar power generators 14 caused by, for example, slow moving clouds passing over the power plant 10. The power point tracker is configured to react to any changes in the output from the solar power generators 14 by adjusting the applied load characteristic, in order to reduce the potential losses in power transfer efficiency of the converter 16. However, because the power point tracking algorithm is arranged to react, directly, to any changes in the power output from the solar power generators it is only able to accommodate gradual changes in their performance, such as those changes that are caused by slow moving clouds.

The converter 16 further comprises an inverter which converts DC electricity to AC electricity, which is transmitted to the main transmission grid 20 under the control of the controller 22. The converter 16 may take the form of an individual hardware controller for each solar power generator 14. Alternatively, each converter 16 may comprise a controller instance (software entity) in a larger, centralised, converter 16.

The controller 22 is connected to each of the converter 16, the wind turbine 12 and the solar power generators 14 by a series of cables (shown as dotted lines in FIG. 1). Hence, the controller 22 is supplied with information relating to the operation and monitoring of the wind turbine 12. The controller 22 may form part of a central control system of the power plant 10. Alternatively, it may be incorporated into the control system for an individual wind turbine 12 or solar power generator 14.

The controller 22 is operable as a command and control interface between the various power generation devices (i.e. the solar power generators 14 and the wind turbine 12) and a grid operator or transmission system operator. To achieve this, the controller 22 comprises a computer system for carrying out suitably prescribed controls and commands. For example, the controller 22 can control the electrical output from the plurality of solar power generators 14 and the wind turbine 12 in order to enable the power plant 10 to meet the demands of the transmission grid 20.

Figure 4:
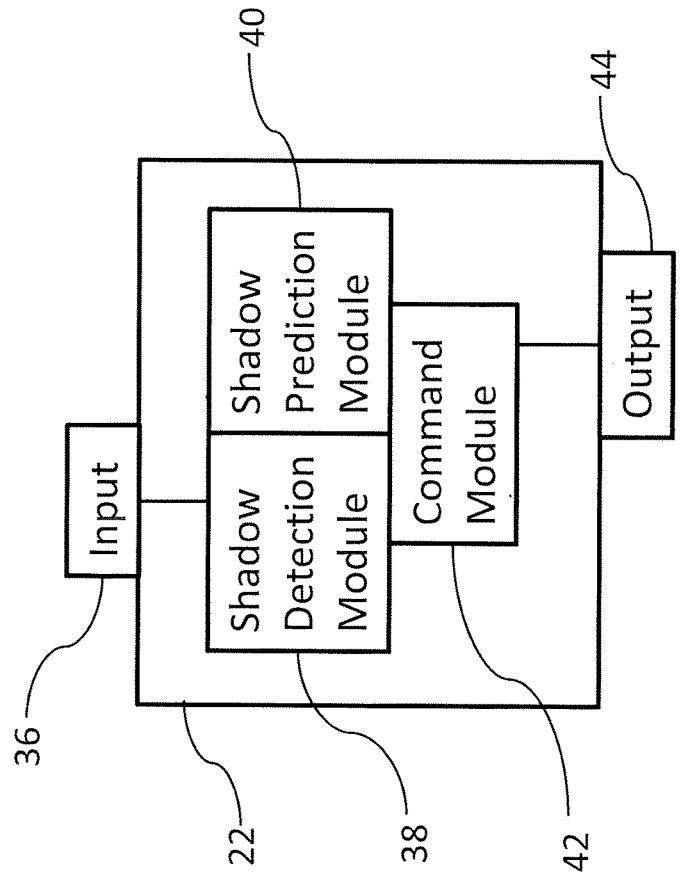
FIG. 4 is a schematic view of a controller for a power plant according to an embodiment of the invention.

With reference to FIG. 4, the controller 22 comprises an input 36 which is arranged to receive an input signal indicative of an operating parameter of a solar power generator 14 of the power plant 10. The controller 22 further comprises a shadow detection module 38 which is arranged to monitor the input signal and to detect one or more shadows at least partially shading the solar power generator 14. A shadow prediction module 40, of the controller 22, is arranged to predict one or more subsequent blade shadow(s) in dependence on the detected blade shadow(s). Finally, a command module 42 is arranged to determine a command signal for controlling the solar power generator 14 based on the blade shadow prediction.

During operation of the controller 22, the command signal is outputted to the converter 16 via an output 44, where it is used to control the operation of the shadow affected solar power generator(s) 14. In particular, the command signal is used to proactively adjust the power point tracking algorithm in order to improve the power transfer efficiency of the converter 16, as will be explained in more detail below.

The shadow detection module 38, the shadow prediction module 40 and the command module 42 are each provided as algorithmic instances on a processor of the controller 22. The processor is arranged to carry out the functions of each module in response to a suitable demand or instruction. Alternatively, each of the controller's modules 38, 40, 42 may be provided as a separate physical processing unit.

During operation of the power plant 10, the controller 22 is arranged to detect when a solar power generator 14 is at least partially overshadowed by a wind turbine blade shadow, and to control the converter 16 in order to optimise the power output from the shadow affected solar power generator 14.

Figure 6:
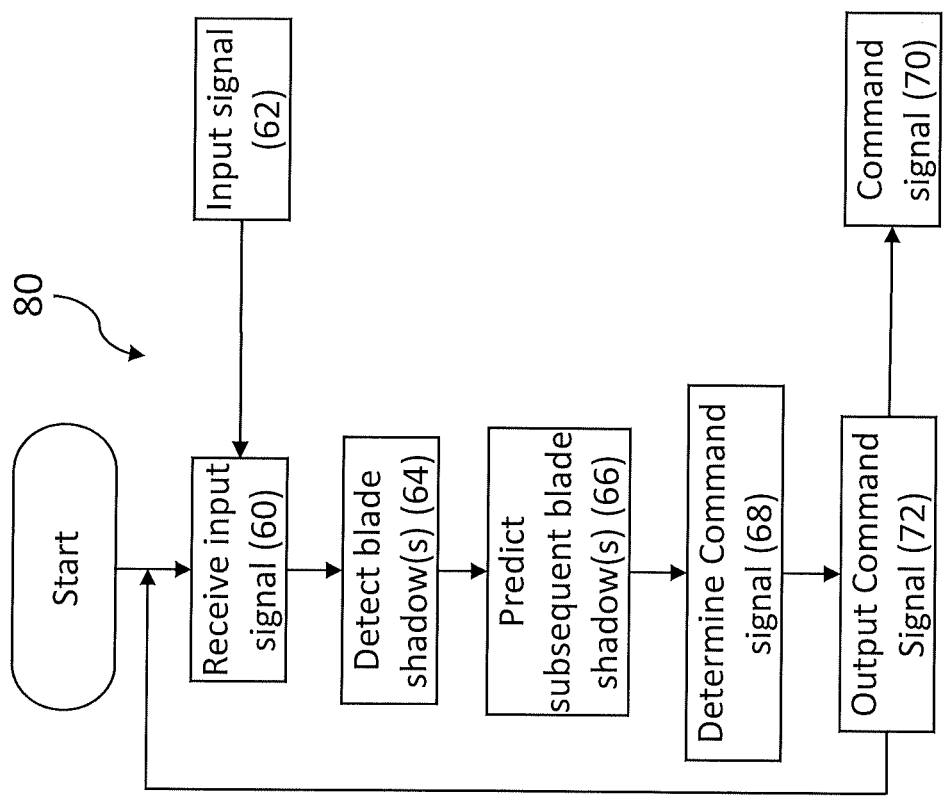
FIG. 6 is a flow chart showing the operation steps of a control method suitable for controlling the power plant according to an embodiment of the invention.

A control strategy for controlling the output of the solar power generators 14 will now be described in more detail with reference to FIG. 5 and FIG. 6. The control strategy comprises a computer implemented control method 80 according to an embodiment of the invention.

With reference to FIG. 5, a plurality of solar power generators 14 are distributed across a shadow affected area 48 of the power plant 10, wherein the shadow affected area 48 is shown as a dashed rectangle in FIG. 5. The solar power generators 14 which are located in the shadow affected area 48 are positioned such that the blades 30 of the wind turbine 12 cause a plurality of blade shadows 50 to pass over the solar power generator 14. In particular, the rotation of the blades 30 relative to the nacelle 26 of the wind turbine 12 blocks incident solar radiation 52 from reaching the solar power generators 14. To accommodate for the dynamic shadowing caused by the rotation of the turbine blades 30, the controller 22 is arranged to predict the incoming blade shadows and to control the converter 16 in order to optimise the power output from the solar power generator 14, as will now be explained in more detail.

In a first step 60 of the control method 80, the input 36 of the controller 22 receives an input signal 62 which is indicative of an operating parameter of a solar power generator 14. The input signal comprises information which is indicative of an operating parameter of at least one solar power generator 14. The operating parameter includes at least one of the operating voltage, the operating current and the output power from a solar power generator 14. In alternative embodiments, the input signal 62 may also act as a trigger for the activation of either the shadow detection or prediction modules 38, 40.

In a second method step 64, the shadow detection module 38 monitors the input signal 62 to detect the occurrence of one or more shadow(s) at least partially shading the solar power generator 14. As described above, there are many causes of solar power generator shadowing besides wind turbines, including clouds, birds and aeroplanes, for example. Unlike with the intermittent causes of shadowing, blade shadows 50 cause periodic shading of the solar power generator 14, which can exhibit a characteristic frequency, or timing. Advantageously, the shadow detection module 38 is able to identify and analyse the shading frequency of the blade shadows 50 from the information contained within the input signal 62.

The shadow detection module 38 is also arranged to confirm whether a detected shadow is caused by the periodic rotation of a wind turbine blade 30. To achieve this, the controller 22 receives input signals which are indicative of the operating parameters of the wind turbine 12. The operating parameters of the wind turbine 12 are compared against the detected shadow data to see whether they are consistent with the rotational speeds of the turbine blades 30. The operating parameter of the wind turbine may be a reference value of typical rotor speeds, for example, which the controller 22 receives from an internal storage medium. Alternatively, the wind turbine operating parameter may be directly measured from the wind turbine 12 and may also include, for example, the yaw position and azimuth angle of the wind turbine.

The controller 22 is also configured to receive input signals comprising meteorological data from which the temporal irradiance conditions of the power plant 10 can be determined. The meteorological data is compared with the detected shadow to confirm whether the sun's position in the sky (or the prevailing weather conditions) would be likely to cause shadowing of the solar power generator 14.

Advantageously, the shadow prediction module 40 is configured to analyse the timing and/or frequency of the detected blade shadow, or shadows, in order to determine the timing of the subsequent blade shadows according to the teaching of the determined shadow pattern. In carrying out method step 64, the detection module 38 is able to distinguish between sporadic shadows that may be caused by intermittent events (such as a bird flying overhead) and the periodic shadows which are caused by the rotating turbine blades 30.

In a third step 66, the shadow prediction module 40 is arranged to predict at least one subsequent blade shadow in dependence on the one or more detected blade shadow(s) 50. According to this step, the input signal 62 is analysed by the shadow prediction module 40 in order to determine a repetitive shadow pattern based on one or more detected blade shadow(s). The determined shadow pattern comprises a shadow frequency which defines the periodicity with which the detected blade shadow passes over the solar power generator 14.

According to an exemplary embodiment of the present invention, the shadow pattern is determined by analysing the effects of a first detected blade shadow 50a and a second detected blade shadow 50b, as shown in FIG. 5. In particular, the shadow prediction module 40 analyses the effect that the first and the second blade shadows 50a, 50b have on the operating parameter of the shadow affected solar power generator 14a. The reduction in power output from the shadow affected solar power generator 14a which is caused by the first and second shadow 50a, 50b is consistent due to the relatively constant rotor speed of the turbine.

The resulting shadow pattern will remain relatively constant over short time intervals such that the prediction module 40 is able to determine a timing of a subsequent blade shadow 50c, which is predicted to follow the second detected blade shadow 50b due to the clockwise rotation of the turbine blades. The timing of the subsequent blade shadow 50c defines a shadow prediction which will be used in subsequent method steps to influence the control of the solar power generator 14.

The shadow prediction comprises a timing interval between the last detected blade shadow 50b and the first predicted blade shadow 50c. This timing interval is also equal to the timing interval between any two directly consecutive predicted blade shadows, which may follow the first predicted blade shadow 15c. The shadow prediction also comprises a timing duration, which corresponds to the time each subsequent blade shadow is predicted to spend at least partially shading the solar power generator 14a.

As well as being arranged to predict when a subsequent blade shadow will pass over the first solar power generator 14a, the controller 22 is also be configured to predict when a detected blade shadow will pass over a second solar power generator 14b which is arranged in a different location to the first solar power generator 14a. In this way, the controller 22 is able to conveniently optimise the output from a plurality of solar power generators which are located along the path of a detected blade shadow 50. It will be appreciated that this alternative mode of operation is equivalent to the method described previously; such that each method relies on receiving the same input signals.

In alternative embodiments, the shadow prediction module 40 is arranged to monitor the timing of a plurality of detected blade shadows in order to determine a repetitive shadow pattern that is based on the average frequency of the plurality of detected blade shadows. The resulting shadow pattern is then used to predict the timing of any subsequent blade shadow, or shadows.

The 'subsequent blade shadow' as described in the preceding paragraphs may refer to any blade shadow which follows the detected blade shadow, or shadows. It will also be appreciated that the controller 22 is not limited to predicting the shadowing of a just one solar power generator 14. Instead, the controller 22 is able to predict blade shadowing for a plurality of solar power generators 14, and to control their operation in dependence on the resulting blade shadow predictions.

In an alternative embodiment, the shadow prediction module 40 is able to predict the timing of a subsequent blade shadow using a single detected blade shadow 50. The timing of the single detected blade shadow is used to calculate the timing of a subsequent blade shadow based on the operating parameters of the wind turbine (i.e. yaw position and azimuth angle, and turbine speed).

The shadow prediction comprises an initial timing of the subsequent blade shadow, which is based on a first detected blade shadow. The initial timing may then be updated by the shadow prediction module upon determining the timing of a second detected shadow. In this way, the shadow prediction may be updated in order to ensure that the solar power generator 14 is controlled in dependence on accurate and up-to-date shadow predictions. For example, the shadow prediction may be updated to reflect a change in turbine speed which may have been cased due to a corresponding change in the wind speed.

In a fourth step 68, the command module 42 determines a command signal 70 comprising instructions suitable for controlling the solar power generator 14 in dependence on the blade shadow prediction. In a fifth step 72, the command signal 70 is then outputted, via the output 44, to the converter 16 which controls the solar power generator 14 in dependence on the instructions that are contained within the command signal 70.

The command signal 70 comprises instructions that control the converter 16 to adjust the load characteristic of the solar power generator 14 at a predetermined time. The converter's power point tracking algorithm is configured to interpret the command signal 70 and thereby adjust the power point tracking value of the solar power generator 14 as the predicted blade shadow starts to at least partially shade the solar power generator 14. Alternatively, the command signal 70 may be configured to direct the power point tracking algorithm to adjust the load characteristic of the solar power generator 14 in advance of the predicted blade shadow at least partially shading the solar power generator 14.

In either case, the command signal 70 is directed by the controller 22 to pre-emptively control the operation of the solar power generator 14 in dependence on the incoming blade shadow. In this way, the command signal 70 acts as a 'feed forward' instruction to the power point tracker of the converter 16. The command signal 70 may be configured to provide the power point tracking algorithm with a specific power point tracking value which is optimised for a particular shadow affected solar power generator 14. Accordingly, the controller 22 is able to proactively control the solar power generator 14 in dependence on the determined shadow pattern of the detected blade shadows. Furthermore, by pre-empting the predicted blade shadow, the controller 22 is able to optimise the operation of the solar power generator 14, and thereby increase the operational efficiency of the power plant 10.

The control method 80 enables the converter 16 to continuously determine the optimum load characteristic for each solar power generator 14. Hence, the controller 22 is arranged to proactively control the solar power generators in dependence on the fast moving blade shadows, which the power point tracking algorithm is unable to accommodate, on its own.

As explained above, the controller 22 is arranged to receive further input signals which may be indicative of meteorological data which relates specifically to the location of the power plant 10. In particular, the further input signals comprise information relating to a set of predetermined meteorological conditions that occur in the vicinity of the solar power generator 14 (and/or wind turbine 12) over time. In particular, the meteorological data includes information that describes how the level of solar irradiation changes throughout the day and/or over the course of a year. For example, the meteorological data may include information which describes the relative angle of the sun in the sky over relevant time periods.

The controller 22 is configured to activate the shadow detection module 38 in dependence on receiving relevant meteorological data. For example, the controller 22 may be operated in dependence on receiving meteorological data which indicates that the irradiance levels at the power plant 10 are high enough to cause significant losses due to shadowing. The controller 22 is, thereby, arranged to only commence its blade shadow detection and/or prediction operations when it is likely to improve the power transfer efficiency of the converter 16.

In embodiments, the meteorological data may be used by the controller 22 to determine the sun's movement with respect to the relative positioning of the solar power generator(s) 14 and/or the wind turbine 12. The controller 22 may also be arranged to only activate the shadow detection and/or prediction modules 38, 40 in dependence on receiving confirmation that a set of predetermined meteorological conditions are occurring in the vicinity of the solar power generator 14 (and/or wind turbine 12). In this way, the controller 22 is configured such that the controller 22 is only activated when a wind turbine blade 30 is likely to shadow at least one of the solar power generators 14.

For example, the detection module 38 may detect a repetitive pattern in the operating parameter of a solar power generator 14. The repetitive pattern may be indicative of a blade shadow 50 passing over the solar power generator 14. However, the controller 22 may also determine from the meteorological data that the positioning of the wind turbine 12 relative to the sun and the solar power converter 14 is such that the repetitive pattern could not have been produced from a blade of the wind turbine 12. Accordingly, the controller 12 would know not to proceed with its shadow prediction operation. Therefore, the controller 22 only proceeds with the control method when it is determined that it would likely increase the power transfer efficiency of the converter 16. The controller 22 thereby reduces its interference with the normal operation of the converter 16 and, thereby, reduces its overall power consumption.

In embodiments, the controller 22 is operable to receive input signals from a light sensing means. The light sensing means may be located in the vicinity of the corresponding solar power generator 14 and the corresponding input signals may comprise light sensor information which is indicative of the operating parameter of the solar power generator 14. The light sensor data is analysed by the shadow detection and prediction modules 38, 40 according to the control method 80 described above.

As described previously, the turbine blades 30 are mounted to the nacelle 26 of the wind turbine 12 and rotate thereabouts under the influence of the wind. The nacelle 26 can also rotate about a longitudinal axis of the tower 24 in order to position the blades 30 in an optimal position to receive the wind. As a result of these movable portions of the wind turbine 12, the blades can project complex shadows over the solar power generators 14 during different periods of the day, and throughout different periods of the year.

Data relating to the dimensions and/or positioning of the wind turbine's 12 components may be used in conjunction with the meteorological data to determine the size and positioning of a particular blade shadow 50. In embodiments, the wind turbine data may be used by the controller 22 to further determine whether a repetitive shadowing pattern is being caused by the rotation of particular wind turbine blade 30 (or blades), given the irradiance conditions at the site of the power plant 10.

The examples described herein are representative only and the skilled reader will appreciate other specific architectures are possible. Moreover, the components of the power plant and the power network are conventional and as such would be familiar to the skilled reader. For example, the diagram of FIG. 1 should be taken as a representation of an exemplary power plant, only. Alternative configurations of power plants are known and it is expected that other known components may be incorporated in addition to or as alternatives to the components shown and described in FIG. 1. Such changes would be within the capabilities of the skilled person. In particular, additional substations or transformers would be expected to be incorporated in the power plant depending upon the number of solar power generators 14 and wind turbines 12 included in the power plant 10.

For example, it will be appreciated that other suitable connection apparatus may be provided to interconnect the controller 22 and the various components of the power plant 10. The interconnections may be direct or 'point to point' connections, or may be part of a local area network (LAN) operated under a suitable protocol (CAN-bus or Ethernet for example). Also, it should be appreciated that rather than using cabling, the control commands may be transmitted wirelessly over a suitable wireless network, for example operating under WiFi™ or ZigBee™ standards (IEEE802.11 and 802.15.4 respectively).

The invention claimed is:

1. A controller for controlling the operation of a power plant, the power plant comprising a wind turbine and a solar power generator, the controller comprising:
   an input arranged to receive an input signal indicative of an operating parameter of the solar power generator;
   a shadow detection module arranged to monitor the operating parameter and to detect a shadow at least partially shading the solar power generator, the detected shadow being caused by a blade of the wind turbine;
   a shadow prediction module arranged to predict at least one subsequent blade shadow in dependence on the detected blade shadow;
   a command module arranged to determine a command signal for controlling the solar power generator based on the blade shadow prediction; and
   an output arranged to output the command signal to the solar power generator, and
   wherein the command signal comprises a power point tracking value that is determined based on the blade shadow prediction and is output to a power point tracking algorithm that uses the power point tracking value to proactively control the solar power generator.

2. A controller according to claim 1, wherein the blade shadow prediction comprises a timing between two subsequent predicted shadows.

3. A controller according to claim 1, wherein the blade shadow prediction comprises a duration of the at least one subsequent blade shadow.

4. A controller according to claim 1, wherein the blade shadow prediction comprises two or more blade shadows which together define a repetitive shadow pattern.

5. A controller according to claim 1, wherein the shadow prediction comprises an initial timing of the subsequent blade shadow based on a first detected blade shadow, the shadow prediction module being configured to update the initial timing in dependence on a second detected shadow.

6. A controller according to claim 1, wherein the command module is configured to output a command signal to adjust a load characteristic of the solar power generator.

7. A controller according to claim 1, wherein the controller is configured to control the solar power generator as the at least one subsequent blade shadow starts to at least partially shade the solar power generator.

8. A controller according to claim 1, wherein the controller is configured to control the solar power generator in advance of the at least one subsequent blade shadow at least partially shading the solar power generator.

9. A controller according to claim 1, in combination with a light sensing means for providing the input signal to the controller, wherein the input signal indicative of an operating parameter of the solar power generator comprises light sensor information associated with the solar power generator.

10. A controller according to claim 1, wherein the input signal comprises a first and a second component, the first component being indicative of an operating parameter of the wind turbine and the second component being indicative of the sun's position relative to the wind turbine and the solar power generator;
    the shadow detection module being configured to detect the blade shadow in dependence on the first and second components.

11. A controller according to claim 10, wherein the operating parameter of the wind turbine corresponds to at least one of a rotation speed, a yaw position, an azimuth angle and a pitch of a blade of the wind turbine.

12. A controller according to claim 10, wherein the shadow prediction module is configured to predict the at least one subsequent shadow in dependence on at least one of a) a time of day and b) a time of year.

13. A controller according to claim 1, wherein the controller is configured to activate the shadow detection module in dependence on receiving a further input signal, the further input signal being indicative of a set of predetermined meteorological conditions occurring in the vicinity of the solar power generator and/or wind turbine.

14. A method of controlling a power plant, the power plant comprising a wind turbine and at least one solar power generator, the method comprising:
    receiving an input signal indicative of an operating parameter of the at least one solar power generator;
    monitoring the operating parameter to detect a shadow at least partially shading the solar power generator, the detected shadow being caused by a blade of the wind turbine;
    predicting at least one subsequent blade shadow in dependence on the detected blade shadow, determining a command signal for controlling the at least one solar power generator in dependence on the blade shadow prediction; and
    outputting the command signal to the solar power generator, and
    wherein the command signal comprises a power point tracking value that is determined based on the blade shadow prediction and is output to a power point tracking algorithm that uses the power point tracking value to proactively control the solar power generator.

15. A power plant comprising a wind turbine, at least one solar power generator and a controller for controlling the operation of the power plant; the controller, comprising:
    an input arranged to receive an input signal indicative of an operating parameter of the solar power generator;
    a shadow detection module arranged to monitor the operating parameter and to detect a shadow at least partially shading the solar power generator, the detected shadow being caused by a blade of the wind turbine;
    a shadow prediction module arranged to predict at least one subsequent blade shadow in dependence on the detected blade shadow;
    a command module arranged to determine a command signal for controlling the solar power generator based on the blade shadow prediction; and
    an output arranged to output the command signal to the solar power generator, and
    wherein the command signal comprises a power point tracking value that is determined based on the blade shadow prediction and is output to a power point tracking algorithm that uses the power point tracking value to proactively control the solar power generator.

16. A power plant according to claim 15, wherein the blade shadow prediction comprises a timing between two subsequent predicted shadows.

17. A power plant according to claim 15, wherein the blade shadow prediction comprises a duration of the at least one subsequent blade shadow.

* * * * *